United States Patent Office 2,917,360
Patented Dec. 15, 1959

2,917,360

METHOD OF PRODUCING PLUTONIUM TETRAFLUORIDE

Willis B. Tolley, Tucson, Ariz., and Robert C. Smith, Richland, Wash., assignors to the United States of America as represented by the United States Atomic Energy Commission No Drawing. Application December 28, 1956
Serial No. 631,381

5 Claims. (Cl. 23—14.5)

This invention deals with a process of producing plutonium tetrafluoride.

Plutonium tetrafluoride is used for the production of plutonium metal by the so-called bomb process which consists in the reduction of plutonium tetrafluoride with calcium or other alkaline earth metal in an autoclave or bomb, preferably in the presence of a booster, such as a calcium-iodine mixture. This process is described, for instance, in application Serial No. 637,485, filed by Glenn T. Seaborg on December 27, 1945, pages 88–90.

Plutonium tetrafluoride has been prepared heretofore from an aqueous plutonium salt solution by first reducing the plutonium to the tetravalent state with hydrogen peroxide, then precipitating the plutonium as the oxalate, drying and decomposing the oxalate at about 300° C. to plutonium dioxide and fluorinating the plutonium dioxide with gaseous hydrogen fluoride. The fluorination step requires an elevated temperature of up to 600° C. and therefore involves serious corrosion problems.

It is an object of this invention to provide a process for the production of plutonium tetrafluoride in which no gaseous hydrogen fluoride is used and no gaseous fluoride is present above 300° C. so that corrosion is reduced to a minimum.

It is another object of this invention to provide a process of producing plutonium tetrafluoride in which a good yield is obtained.

These objects are accomplished by drying plutonium (IV) oxalate in a current of air at between 125 and 150° C., heating the dried oxalate at about 300° C. whereby it is decomposed and plutonium dioxide is formed, admixing ammonium bifluoride with said plutonium dioxide, heating the mixture thus obtained to between about 50 and 150° C. whereby plutonium ammonium fluoride, probably $PuNH_4F_5$, is formed, and heating said plutonium ammonium fluoride to about 300° C. whereby ammonium fluoride is volatilized and plutonium tetrafluoride remains as a residue.

The plutonium (IV) oxalate may be precipitated from an aqueous solution, for instance from a nitric acid or hydrochloric acid solution. If the plutonium, or part of it, is not present in said aqueous solution in the tetravalent state, hydrogen peroxide, or any other suitable reducing agent known to those skilled in the art, is added whereby hexavalent or pentavalent plutonium is reduced to the tetravalent state. Thereafter oxalic acid or a water-soluble oxalate is added whereby the plutonium is precipitated as the plutonium (IV) oxalate. The precipitate is then separated from the supernatant, dried in a current of air at between 125 and 150° C. followed by heating at about 300° C. During this last heating step the oxalate is decomposed, and plutonium dioxide is formed.

To the dry plutonium dioxide there is then admixed ammonium bifluoride, preferably in a quantity excessive of that stoichiometrically required (the optimum excess is about 40% by weight), and the mixture is heated to between 50 and 150° C. whereby the double salt ammonium plutonium fluoride is formed. This double salt is then decomposed by raising the temperature to 300° C.; ammonium fluoride is volatilized thereby, and plutonium tetrafluoride remains as a residue. Both heating steps are advantageously carried out in an inert atmosphere, for instance, in argon gas or in a vacuum.

In the following an example is given to illustrate the process of this invention.

*Example*

Freshly precipitated plutonium (IV) oxalate was placed in a reaction vessel and dried therein in a current of air at about 135° C. for one hour. The temperature was then raised to about 300° C. whereby the oxalate decomposed and plutonium dioxide was formed.

Twenty grams of said plutonium dioxide was then mixed with 15 grams of ammonium bifluoride. The mixture was heated in a stream of argon for one hour at 150° C., and the double salt plutonium ammonium fluoride formed thereby was heated at 300° C. for 1½ hours whereby ammonium fluoride and excess ammonium bifluoride were volatilized; both were collected in a cold trap for reuse. The plutonium tetrafluoride formed remained in the reaction vessel. The plutonium tetrafluoride was then heated for two hours at 500° C. whereby it was dehydrated. The product thus obtained was analyzed and found to contain 95% by weight of $PuF_4$, the remaining 5% being $PuO_2$. The plutonium tetrafluoride obtained was reduced with calcium to metallic plutonium in a closed container by the process mentioned in the introduction.

It will be understood that this invention is not to be limited by the details given herein but that it may be modified within the scope of the appended claims.

What is claimed is:

1. A process of making plutonium tetrafluoride, comprising drying plutonium (IV) oxalate at 125 to 150° C.; heating the dried oxalate to about 300° C. whereby plutonium dioxide is formed; admixing solid ammonium bifluoride to said plutonium dioxide; heating the mixture thus obtained to between about 50 and 150° C. whereby plutonium ammonium fluoride is formed; and heating said plutonium ammonium fluoride to about 300° C. whereby ammonium fluoride is volatilized and plutonium tetrafluoride is formed.

2. The process of claim 1 whereby the quantity of ammonium bifluoride is excessive of that stoichiometrically required.

3. The process of claim 2 wherein the excessive quantity is about 40% by weight of the stoichiometric amount.

4. The process of claim 1 wherein heating of the plutonium dioxide-ammonium bifluoride mixture and of the plutonium ammonium fluoride are carried out in an inert atmosphere.

5. The process of claim 4 wherein the inert atmosphere is argon gas.

References Cited in the file of this patent

UNITED STATES PATENTS

| | | |
|---|---|---|
| 1,426,890 | McClenahan | Aug. 22, 1922 |
| 2,042,434 | Svendsen | May 26, 1936 |
| 2,173,290 | Adamoli | Sept. 19, 1939 |

OTHER REFERENCES

Mellor: "Comprehensive Treatise of Inorganic and Theoretical Chemistry," vol. II, page 521 (1922). Publ. by Longmans, Green & Co., London.

Westrum: "The Transuranium Elements," NNES IV–14B, part 2, pages 936–944 (1949).

Katz et al.: "The Chemistry of Uranium," NNES VIII–5, pages 361, 365 (1951).

Seaborg et al.: "The Actinide Elements," NNES IV–14A, pages 377–382, 394, 395 (1954).